US011872168B2

(12) United States Patent
Qiu

(10) Patent No.: US 11,872,168 B2
(45) Date of Patent: Jan. 16, 2024

(54) STAIR LIFT

(71) Applicant: Lin Qiu, Fujian (CN)

(72) Inventor: Lin Qiu, Fujian (CN)

( * ) Notice: Subject to any disclaimer, the term of this patent is extended or adjusted under 35 U.S.C. 154(b) by 682 days.

(21) Appl. No.: 17/057,098

(22) PCT Filed: Jan. 24, 2019

(86) PCT No.: PCT/CN2019/072995
§ 371 (c)(1),
(2) Date: Nov. 19, 2020

(87) PCT Pub. No.: WO2019/144911
PCT Pub. Date: Aug. 1, 2019

(65) Prior Publication Data

US 2021/0393458 A1 Dec. 23, 2021

(30) Foreign Application Priority Data

Jan. 26, 2018 (JP) .................................. 2018-11140

(51) Int. Cl.
*A61G 5/06* (2006.01)

(52) U.S. Cl.
CPC .................................. *A61G 5/061* (2013.01)

(58) Field of Classification Search
CPC .................................................. A61G 5/061
See application file for complete search history.

(56) References Cited

U.S. PATENT DOCUMENTS

| | | | | |
|---|---|---|---|---|
| 5,653,301 A * | 8/1997 | Andre | .................... | A61G 5/061 180/8.5 |
| 9,333,980 B1 | 5/2016 | Liu et al. | | |
| 10,583,056 B2 * | 3/2020 | Naccarato | .............. | A61G 5/061 |
| 10,925,782 B2 * | 2/2021 | Naccarato | .............. | A61B 5/023 |

FOREIGN PATENT DOCUMENTS

| | | |
|---|---|---|
| CN | 2451090 Y | 10/2001 |
| CN | 101954936 A | 1/2011 |
| CN | 103393509 A | 11/2013 |
| CN | 104149869 A | 11/2014 |
| CN | 106176075 A | 12/2016 |

(Continued)

*Primary Examiner* — Kevin Hurley
*Assistant Examiner* — Hosam Shabara
(74) *Attorney, Agent, or Firm* — Robert L. Stearns; Dickinson Wright PLLC

(57) ABSTRACT

A stair lift, including: a carrier portion, configured for carrying a person or an object; a lift portion, configured for moving relative to the carrier portion; and a driver mechanism, configured for inducing the relative movement. The carrier portion and the lift portion are connected and supported via a guide mechanism, and are configured for freely translating along an X-Z plane relative to each other. The driver mechanism includes a circulation moving mechanism, and the circulation moving mechanism includes a driving pin (moving member), configured for moving along a predetermined closed track under the driving of a single gear motor. The driving pin (moving member) is connected to the lift portion, such that the carrier portion and the lift portion are configured for moving relative to each other along the track, whereby enabling the stair lift to go upstairs or downstairs.

1 Claim, 13 Drawing Sheets

(56) References Cited

FOREIGN PATENT DOCUMENTS

| | | | |
|---|---|---|---|
| CN | 106627828 | A | 5/2017 |
| CN | 106687095 | A | 5/2017 |
| CN | 206417095 | U | 5/2017 |
| CN | 206453912 | U | 9/2017 |
| EP | 1852328 | A2 | 11/2007 |
| JP | H07267094 | A | 10/1995 |
| JP | 2010235229 | A | 10/2010 |
| JP | 2015504388 | A | 2/2015 |
| JP | 2016193721 | A | 11/2016 |
| JP | 6364135 | B1 | 8/2019 |
| WO | 2017088048 | A1 | 6/2017 |

* cited by examiner

STAIR LIFT

CROSS-REFERENCE TO RELATED APPLICATIONS

The present application is a 35 U.S.C. § 371 national stage application of PCT Application Ser. No. PCT/CN2019/072995, filed on Jan. 24, 2019, which claims priority to Japanese Patent Application No. 2018-11140, filed with the Japanese Patent Office on Jan. 26, 2018, the entire contents of which are incorporated herein by reference in their entireties.

TECHNICAL FIELD

The present application relates to a stair lift which helps or assists people or things in going upstairs and downstairs.

BACKGROUND

There are strong demands for functions of climbing stairs, for example, in fields of mobility support for persons with lower limb function decline (low limb disabled, elderly, etc.), transportation of heavy person or objects, and disaster prevention robots. In order to meet such demands, a number of stair lifts have been proposed.

For example, a stair lift adopting a crawler (infinite track) has high stability when climbing linear stairs and has been put into practical use.

Further, Patent Document 1 (Japanese Patent No. 4637962) discloses a stair lift that goes upstairs or downstairs by eccentrically rotating a traveling wheel arranged on an eccentric arm. The device is advantageous in relatively simple structure, light weight, and small size, and can be installed on a wheelchair.

Further, Patent Document 2 (Japanese Patent Publication No. 2015-504388) discloses a stair lift that goes upstairs or downstairs by independently and alternately driving vertical movements and horizontal movements of legs by using at least two or more driver sources.

Further, Patent Document 3 (Chinese Patent Publication No. CN 106176075 A) discloses a wheelchair for ascending and descending stairs using a transmission mechanism of a total of four sets of round gears and non-round gears in two axes. An inner structure of the wheelchair includes a wheelchair main body, a rear wheel front/rear movement mechanism, and a drive mechanism for climbing the stairs. By simultaneously driving the transmission mechanism of the four sets of round gears and non-round gears in two axes, the inner structure and the outer structure (of the wheelchair) alternately move relative to each other to going upstairs or downstairs.

However, when using a crawler (infinite track), there is a problem that the crawler track cannot stably and smoothly conform to a traveling surface of the stair at start and end points. In addition, it also has the problem in adaptability of the spiral staircase, as well as inevitable damage to the step edge part (especially in case of a wooden stair, which is a remarkable problem).

Further, in the technique described in Patent Document 1, while ascending and descending stairs, the left-right direction is relatively stable due to the structure, but the front-back direction is unstable. In addition, since "switching from the upper step to the lower step" or "switching from the lower step to the upper step" is performed instantaneously, the load applied to the operator suddenly changes at the time of the switching, and there is a risk that the device may fall off the stairs.

Further, in the technique described in Patent Document 3, the entire device may be clumsy due to the structure of the drive mechanism.

As described in the above, in general, in the conventional stair lifts, if the structure is simple, the apparatus may become unstable in the front-rear direction when ascending and descending stairs, resulting in low safety. On the other hand, the apparatus that is supported by the traveling surface (including a step surface of the stair) is stable in both the left-right direction and the front-rear direction and has improved safety, however, the driver system thereof becomes complicated due to the necessity in equipping multiple driver sources, which results in clumsy structure requiring a certain installation space and is disadvantageous in costs.

Technical Problems

It is objectives of embodiments of the present application to provide a stair lift with a simple structure and high safety.

Technical Solutions

To solve the above technical problems, the following technical solutions are adopted by embodiments of the present applications:

A first aspect of the present application provides a stair lift, which comprises: a carrier portion, configured for carrying a person or an object; a lift portion, configured for moving relative to the carrier portion; and a driver mechanism, configured for inducing the relative movement. The carrier portion and the lift portion are connected and supported via a guide mechanism, and are configured for freely translating along an X-Z plane relative to each other, in which, the guide mechanism is independent of the driver mechanism. The driver mechanism comprises a driver source and a circulation moving mechanism; and the circulation moving mechanism comprises a moving member, configured for moving along a predetermined closed track under a driving force of the driver source. By connecting the moving member to the lift portion or by connecting the moving member to the carrier portion, the carrier portion and the lift portion are configured for moving relative to each other along the track, whereby enabling the stair lift to go upstairs or downstairs.

A second aspect of the present application provides a stair lift, which comprises: a carrier portion, configured for carrying a person or an object; a lift portion, configured for moving relative to the carrier portion; and a driver mechanism, configured for inducing the relative movement. The carrier portion and the lift portion are connected and supported via a guide mechanism, and are configured for freely translating along an X-Z plane relative to each other. The driver mechanism comprises a driver source and a circulation moving mechanism; and the circulation moving mechanism comprises a moving member, configured for moving along a predetermined closed track under a driving force of the driver source. By connecting the moving member to the lift portion or by connecting the moving member to the carrier portion, the carrier portion and the lift portion are configured for moving relative to each other along the track, whereby enabling the stair lift to go upstairs or downstairs.

The circulation moving mechanism comprises: a slot defined along the track; a plurality of cylinders or stepped cylinders, vertically arranged in a row, with one end of each of the plurality of cylinders or stepped cylinders in an axis direction being inserted into the slot and configured for circulating along the slot; and a sprocket, configured for rotating under the driving force of the driver source and meshing with the plurality of cylinders or stepped cylinders. The plurality of cylinders or stepped cylinders are configured for circulating and moving along the slot by the rotation of the sprockets. A specific one of the plurality of cylinders or stepped cylinders serves as the moving member, or alternatively, the specific one of the plurality of cylinders or stepped cylinders is connected to the moving member.

A third aspect of the present application provides a stair lift, which comprises: a carrier portion, configured for carrying a person or an object; a lift portion, configured for moving relative to the carrier portion; and a driver mechanism, configured for inducing the relative movement. The carrier portion and the lift portion are connected and supported via a guide mechanism, and are configured for freely translating along an X-Z plane relative to each other. The driver mechanism comprises a driver source and a circulation moving mechanism; and the circulation moving mechanism comprises a moving member, configured for moving along a predetermined closed track under a driving force of the driver source. By connecting the moving member to the lift portion or by connecting the moving member to the carrier portion, the carrier portion and the lift portion are configured for moving relative to each other along the track, whereby enabling the stair lift to go upstairs or downstairs.

The circulation moving mechanism comprises: a loop-shaped circulation portion, formed by a transmission chain or a toothed belt; a rotator, configured for guiding the circulation portion to circulate along the track; and a sprocket or a pulley, configured for rotating under the driving force of the driver source and meshing with the circulation portion. The circulation portion is configured for circulating along the slot by the rotation of the sprocket or the pulley. A specific part of the circulation portion serves as the moving member, or alternatively, the specific part of the circulation portion is connected to the moving member.

A forth aspect of the present application provides a stair lift, which comprises: a carrier portion, configured for carrying a person or an object; a lift portion, configured for moving relative to the carrier portion; and a driver mechanism, configured for inducing the relative movement. The carrier portion and the lift portion are connected and supported via a guide mechanism, and are configured for freely translating along an X-Z plane relative to each other. The driver mechanism comprises a driver source and a circulation moving mechanism; and the circulation moving mechanism comprises a moving member, configured for moving along a predetermined closed track under a driving force of the driver source. By connecting the moving member to the lift portion or by connecting the moving member to the carrier portion, the carrier portion and the lift portion are configured for moving relative to each other along the track, whereby enabling the stair lift to go upstairs or downstairs.

The circulation moving mechanism comprises: a slot defined along the track; a pinion, configured for rotating under a driving force of the driver source, and moving and revolving around an axis, which is a center position in a width direction of the slot, along the slot in a manner similar to trace the center position in the width direction of the slot; and an external gear or an internal gear, configured for meshing with the pinion when the pinion rotates while circulating along the slot. The moving member is in a connection manner that allows the moving member to circulate together with the pinion which is configured for circulating along the slot.

A fifth aspect of the present application provides a stair lift, which comprises: a carrier portion, configured for carrying a person or an object; a lift portion, configured for moving relative to the carrier portion; and a driver mechanism, configured for inducing the relative movement. The carrier portion and the lift portion are connected and supported via a guide mechanism, and are configured for freely translating along an X-Z plane relative to each other. The driver mechanism comprises a driver source and a circulation moving mechanism; and the circulation moving mechanism comprises a moving member, configured for moving along a predetermined closed track under a driving force of the driver source. By connecting the moving member to the lift portion or by connecting the moving member to the carrier portion, the carrier portion and the lift portion are configured for moving relative to each other along the track, whereby enabling the stair lift to go upstairs or downstairs. The circulation moving mechanism comprises: a pinion, provided thereon with a driving pin at a center or an eccentric position of an end face thereof; a gear, configured for meshing with the pinion; and an arm, supported at an axis of the pinion and an axis of the gear whereby enabling the pinion to mesh with the gear. The pinion is configured for rotating and at the same time revolving along an inner periphery or an outer periphery of the gear, whereby allowing the driving pin to circulate along the track.

A sixth aspect of the present application provides a stair lift, which comprises: a carrier portion, configured for carrying a person or an object; a lift portion, configured for moving relative to the carrier portion; and a driver mechanism, configured for inducing the relative movement. The carrier portion and the lift portion are connected and supported via a guide mechanism, and are configured for freely translating along an X-Z plane relative to each other. The driver mechanism comprises a driver source and a circulation moving mechanism. The circulation moving mechanism comprises a moving member, configured for moving along a predetermined closed track under a driving force of the driver source. By connecting the moving member to the lift portion or by connecting the moving member to the carrier portion, the carrier portion and the lift portion are configured for moving relative to each other along the track, whereby enabling the stair lift to go upstairs or downstairs;

The circulation moving mechanism comprises: a slot defined along the track; a pin, inserted into the slot and configured for circulating in and along the slot; an arm, pivotally supported by a rotating shaft and in connection with the pin, wherein the rotating shaft is disposed at a substantial center of the slot and configured for rotating under the driving force of the driver source; and a slider mechanism, arranged at a pivotal support portion between the arm and the rotating shaft, and configured to enable the arm to move in a radial direction of the rotating shaft relative to the rotating shaft. The pin serves as the moving member, or alternatively, the pin is connected to the moving member.

A seventh aspect of the present application provides a stair lift, which comprises: a carrier portion; a lift portion; a driver mechanism, provided with a single driver source; an up-down directional moving mechanism, configured for inducing a relative movement between the carrier portion and the lift portion in an up-down direction; a front-rear directional moving mechanism, configured for inducing a relative movement between the carrier portion and the lift portion in a front-rear direction; a first locking means, configured for locking the up-down directional moving mechanism; and a second locking means, configured for locking the front-rear directional moving mechanism. The up-down directional moving mechanism and the front-rear directional moving mechanism are respectively driven by different output forms of the driver mechanism. The first locking means and the second locking means are alternately locked, and at the same time, the driver mechanism sequentially moves the carrier portion and the lift portion relative to each other in the front-rear direction or the up-down direction, such that the lift portion and the carrier portion perform translational movements relative to each other along a closed circulation motion track with constant postures, whereby going upstairs or downstairs.

A eighth aspect of the present application provides a stair lift, which comprises: a carrier portion, configured for carrying a person or an object; a lift portion, configured for moving relative to the carrier portion; and a driver mechanism, configured for inducing the relative movement. The carrier portion and the lift portion are connected and supported via a guide mechanism, and are configured for freely translating along an X-Z plane relative to each other. The driver mechanism comprises a driver source and a circulation moving mechanism. The circulation moving mechanism comprises a moving member, configured for moving along a predetermined closed track under a driving force of the driver source. By connecting the moving member to the lift portion or by connecting the moving member to the carrier portion, the carrier portion and the lift portion are configured for moving relative to each other along the track, whereby enabling the stair lift to go upstairs or downstairs. The circulation moving mechanism comprises: a slot defined along the track; an arm, pivotally supported by a rotating shaft and defining therein an elongated hole at one end, wherein the rotating shaft is disposed at a substantial center of the slot and configured for rotating under the driving force of the driver source; and a pin, inserted into both the elongated hole of the arm and the slot and configured for circulating in and along the slot. The pin serves as the moving member, or alternatively, the pin is connected to the moving member.

BENEFICIAL EFFECTS

Compared with the prior art, the beneficial effects of the stair lift provided by embodiments of the present application are summarized as follows:

Such a configuration makes it possible to provide the stair lift that realizes the purpose of simple structure, simple control, and high safety. Herein, the circulation moving mechanism refers to a mechanism that outputs a movement along a closed curve track in a certain plane. The translational motion refer to a translational motion in orthogonal directions with restricted rotational degrees of freedom, or a motion with such a translational motion as the main component. If the motion track can cover the motion tack of the circulation moving mechanism adopted in the present application, the regional track with a certain area can be used, and the track without the area can also be used.

In addition, (in the above configuration, whether the guide mechanism and the driver mechanism are independent from each other does not matter) the circulation moving mechanism may adopt the following configuration, comprising: a slot defined along the track; a plurality of cylinders or stepped cylinders, vertically arranged in a row, with one end of each of the plurality of cylinders or stepped cylinders in an axis direction being inserted into the slot and configured for circulating along the slot; and a sprocket, configured for rotating under a driving force of the driver source and meshing with the plurality of cylinders or stepped cylinders. The plurality of cylinders or stepped cylinders are configured for circulating and moving along the slot by the rotation of the sprockets; and a specific one of the plurality of cylinders or stepped cylinders serves as the moving member, or alternatively, the specific one of the plurality of cylinders or stepped cylinders is connected to the moving member.

Such a configuration can provide the stair lift with a circulation moving mechanism having a small volume and a large load.

In addition, (in the above configuration, whether the guide mechanism and the driver mechanism are independent from each other does not matter) the circulation moving mechanism may adopt the following configuration, comprising: a loop-shaped circulation portion, formed by a transmission chain or a toothed belt; a rotator, configured for guiding the circulation portion to circulate along the track; and a sprocket or a pulley, configured for rotating under the driving force of the driver source and meshing with the circulation portion. The circulation portion is configured for circulating along the slot by the rotation of the sprocket or the pulley. A specific part of the circulation portion serves as the moving member, or alternatively, the specific part of the circulation portion is connected to the moving member.

With such a configuration, it is possible to provide the stair lift with a circular motion mechanism that flexibly utilizes inexpensive general-purpose mechanical parts.

In addition, (in the above configuration, whether the guide mechanism and the driver mechanism are independent from each other does not matter) the circulation moving mechanism may adopt the following configuration, comprising: a slot defined along the track; a pinion, configured for rotating under a driving force of the driver source, and moving and revolving around an axis, which is a center position in a width direction of the slot, along the slot in a manner similar to trace the center position in the width direction of the slot; and an external gear or an internal gear, configured for meshing with the pinion when the pinion rotates while circulating along the slot. The moving member is in a connection manner that allows the moving member to circulate together with the pinion which is configured for circulating along the slot.

Such a configuration can provide a stair lift with a circulation moving mechanism that has a direct driving as well as a simple means (slot) for ensuring the meshing of the gears, in which, the direct driving realizes high transmission efficiency and does not have the deterioration problem caused by the stretching of a part of the structural parts rather than time changes, thereby being easy to maintain.

In addition, (in the above configuration, whether the guide mechanism and the driver mechanism are independent from each other does not matter) the circulation moving mechanism may adopt the following configuration, comprising: a pinion, provided thereon with a driving pin at a center or an eccentric position of an end face thereof; a gear, configured for meshing with the pinion; and an arm, supported at an axis of the pinion and an axis of the gear whereby enabling the pinion to mesh with the gear. The pinion is configured for rotating and at the same time revolving along an inner periphery or an outer periphery of the gear, whereby allowing the driving pin to circulate along the track.

Such a configuration can provide a stair lift with a circulation moving mechanism, in which, a direct driving is adopted, thereby having a high transmission efficiency; in addition, such configuration does not have the deterioration problem caused by the stretching of a part of the structural parts rather than time changes, thereby being easy to maintain; and the assembly accuracy can be easily satisfied. Herein, the axis of the gear also includes a rough center when the gear is a non-circular gear (such as an ellipse, a rounded quadrilateral, etc.).

In addition, (in the above configuration, whether the guide mechanism and the driver mechanism are independent from each other does not matter) the circulation moving mechanism may adopt the following configuration, comprising: a slot defined along the track; a pin, inserted into the slot and configured for circulating in and along the slot; an arm, pivotally supported by a rotating shaft and in connection with the pin, wherein the rotating shaft is disposed at a substantial center of the slot and configured for rotating under the driving force of the driver source; and a slider mechanism, arranged at a pivotal support portion between the arm and the rotating shaft, and configured to enable the arm to move in a radial direction of the rotating shaft relative to the rotating shaft. The pin serves as the moving member, or alternatively, the pin is connected to the moving member.

Such a configuration can provide the stair lift with a circular motion mechanism with an easy structural layout.

In addition, (in the above configuration, whether the guide mechanism and the driver mechanism are independent from each other does not matter) the circulation moving mechanism may adopt the following configuration, comprising: a slot defined along the track; an arm, pivotally supported by a rotating shaft and defining therein an elongated hole at one end, wherein the rotating shaft is disposed at a substantial center of the slot and configured for rotating under the driving force of the driver source; and a pin, inserted into both the elongated hole of the arm and the slot and configured for circulating in and along the slot. The pin serves as the moving member, or alternatively, the pin is connected to the moving member.

In such a configuration, although the range swept by the rotation of the arm is usually larger than the range of the slot (closed track), which may bring inconvenience to the structural layout of the apparatus, but it is beneficial to provide a stair lift with a circulation moving mechanism in a simpler structure.

In addition, the present application further provides a stair lift, which comprises: a carrier portion; a lift portion; a driver mechanism, provided with a single driver source; an up-down directional moving mechanism, configured for inducing a relative movement between the carrier portion and the lift portion in an up-down direction; a front-rear directional moving mechanism, configured for inducing a relative movement between the carrier portion and the lift portion in a front-rear direction; a first locking means, configured for locking the up-down directional moving mechanism; and a second locking means, configured for locking the front-rear directional moving mechanism. The up-down directional moving mechanism and the front-rear directional moving mechanism are respectively driven by different output forms of the driver mechanism. The first locking means and the second locking means are alternately locked, and at the same time, the driver mechanism sequentially moves the carrier portion and the lift portion relative to each other in the front-rear direction or the up-down direction, such that the lift portion and the carrier portion perform translational movements relative to each other along a closed circulation motion track with constant postures, whereby going upstairs or downstairs. By such configuration, the same purpose and effect of the stair lift can be achieved.

With this configuration, it is possible to provide a compact apparatus by driving the apparatus with different output forms of the drive mechanism that requires only one drive source. Further, when ascending or descending stairs having different step widths, the front-rear movable distance range of the carrier portion and the lift portion of the apparatus may be adjusted according to the step widths of the stairs. Since it is possible, it is possible to provide a stair lift that is much safer when ascending and descending stairs with large step widths.

Solutions provided by the present application are as described in the above, comprehensively, the problem of the crawler is avoided, and the device hardly changes its posture. In addition, the stair lift has the carrier portion and the lift portion, which perform translational movements relative to each other to go upstairs or downstairs, thus the surface support structure with improved safety is easily realized. Further, by limiting the support surface of the apparatus to two traveling surfaces (including the step surfaces of the stairs) on adjacent steps in the traveling direction, one driver source is sufficient.

In addition, in the present specification and claims, "translational motion" means that two parts (refer to the carrier portion and the lift portion in the present application) do not change their postures relative, that is, no relative rotation occurs, it means relative movement where the two parts perform translational movement along a predetermined track (in the X-Z plane), or repetition of a relative movement primarily including such a translational movement.

In addition, in this specification and claims, the "front" or "front side" of the stair lift refers to the side in a traveling direction when going upstairs; the "rear" or "rear side" of the stair lift refers to the side in the traveling direction when going downstairs. At the same time, the "left" and "right" of the stair lift refer to the left and right based on the front or front side.

BRIEF DESCRIPTION OF THE DRAWINGS

In order to more clearly illustrate the technical solutions in the embodiments of the present application, the drawings that need to be used in the description of the embodiments or the prior art will be briefly described hereinbelow. Obviously, the accompanying drawings in the following description are only some embodiments of the present application. For those skilled in the art, other drawings can be obtained based on these drawings without creative work.

FIGS. 18A-18B are an example of the approximate linear guide mechanism illustrated in an embodiment of the present application, in which, FIG. 18A illustrates a schematic side view of a ready state (non-swinging state) of the stair lift configured with the approximate linear guide mechanism, and FIG. 18B illustrates a state (swinging state) where the carrier portion is moving to a position of the same height of the next stair step;

Figure 1:
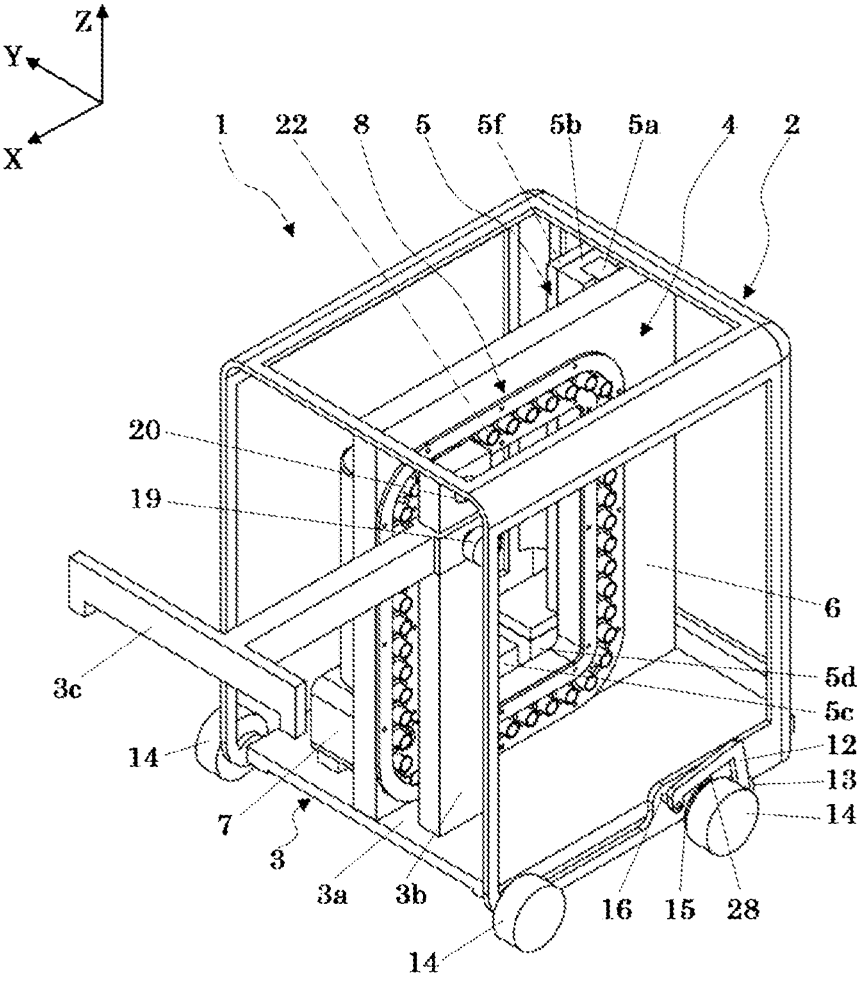
FIG. 1 is a left front isometric view of a stair lift in an embodiment of the present application.

In the drawings, the following reference numerals are adopted:

1: Stair lift; 2: Carrier portion; 3: Lift portion; 3*a*: Bottom plate; 3*b*: Support; 3*c*: Lifting auxiliary arm; 4: Driver mechanism; 5: Guide mechanism; 5*a*: Longitudinal rail; 5*b*: Longitudinal slider; 5*c*: Horizontal rail; 5*d*: Horizontal slider; 5*f*: Slider connector; 6: Main plate; 7: Gear motor (driver source); 8: Circulation moving mechanism; 12: Brake crank; 13: Brake wheel; 14: Caster; 15: Rachet; 16: Rotational shaft; 19: Fixation handle; 22: Rollers; 23, 24: Baffle; 30: Transmission chain; 40: Toothed belt (belt with teeth); and 91: Stair.

DETAILED DESCRIPTION OF THE EMBODIMENTS

In order to make the purposes, technical solutions, and advantages of the present application clearer and more understandable, the present application will be further described in detail hereinafter with reference to the accompanying drawings and embodiments. It should be understood that the embodiments described herein are only intended to illustrate but not to limit the present application.

It should be noted that when an element is described as “fixed” or “arranged” on/at another element, it means that the element can be directly or indirectly fixed or arranged on/at another element. When an element is described as “connected” to/with another element, it means that the element can be directly or indirectly connected to/with another element.

It should be also noted that the same or similar reference numerals are used to refer to the same or similar elements. It should be understood that terms “length”, “width”, “upper”, “left”, “right”, and the like indicating orientation or positional relationship are based on the orientation or the positional relationship shown in the drawings, and are merely for facilitating and simplifying the description of the present application, rather than indicating or implying that a device or component must have a particular orientation, or be configured or operated in a particular orientation, and thus terms indicating the positional relationship are only used for exemplary illustration, instead of limiting the application. For those ordinary skills in the art, specific meanings of the above terms may be understood according to specific circumstances.

Moreover, the terms “first” and “second” are adopted for descriptive purposes only and are not to be construed as indicating or implying a relative importance or implicitly indicating the number of technical features indicated. Thus, features prefixed by “first” and “second” will explicitly or implicitly represent that one or more of the referred technical features are included. In the description of the present application, the meaning of “a plurality of” or “multiple” is two or more unless otherwise specifically defined.

The stair lift 1 as an example of an embodiment of the present application will be described hereinbelow with reference to the drawings. Here, it should be noted that, in order to facilitate the understanding of the drawings, the sizes and dimensions in some drawings are exaggerated and may not match the actual apparatus. In addition, each drawing shows the part that has been indicated by reference numerals; and in some of the drawings, a thin line represents a closed circulation motion track, and a black dot on the thin line represents a driving pin (described hereinbelow), rather than a specific constituent elements or parts. In addition, dash-dotted lines indicate different positions of moving parts.

Configuration of Stair Lift

Figure 2:
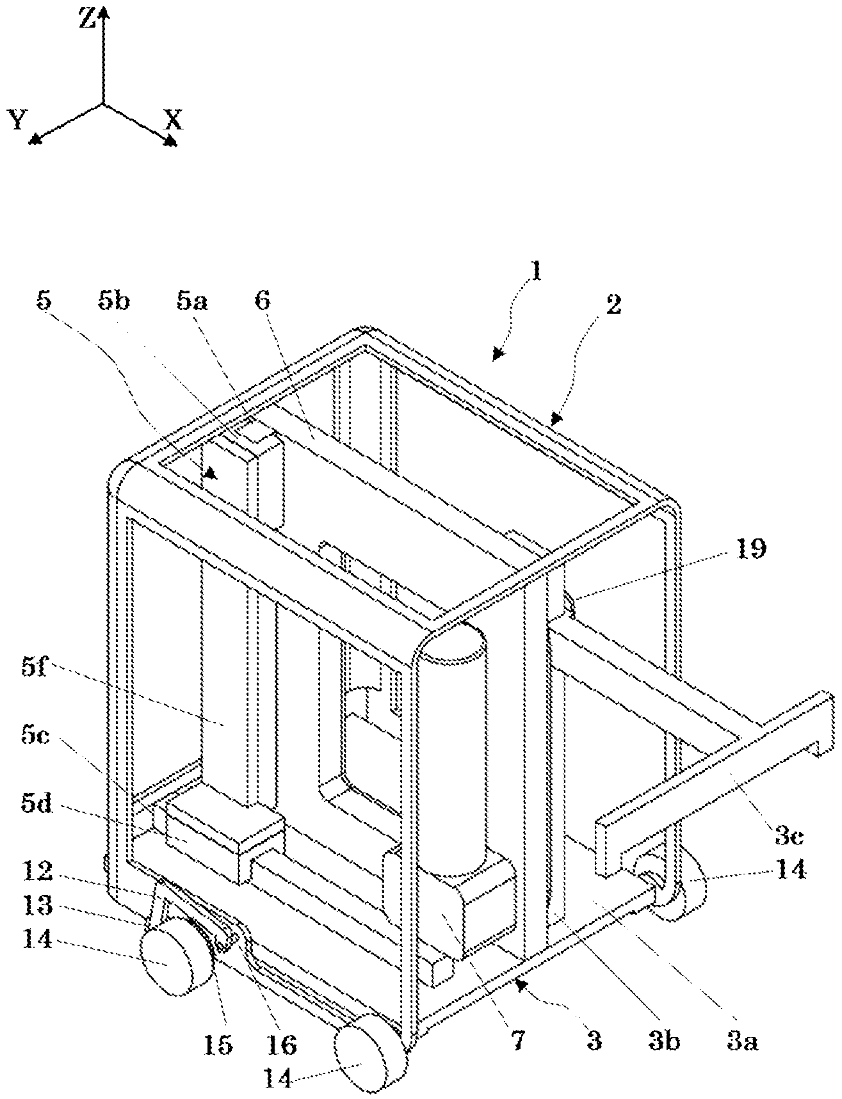
FIG. 2 is a right front isometric view of a stair lift in an embodiment of the present application.
Figure 3:
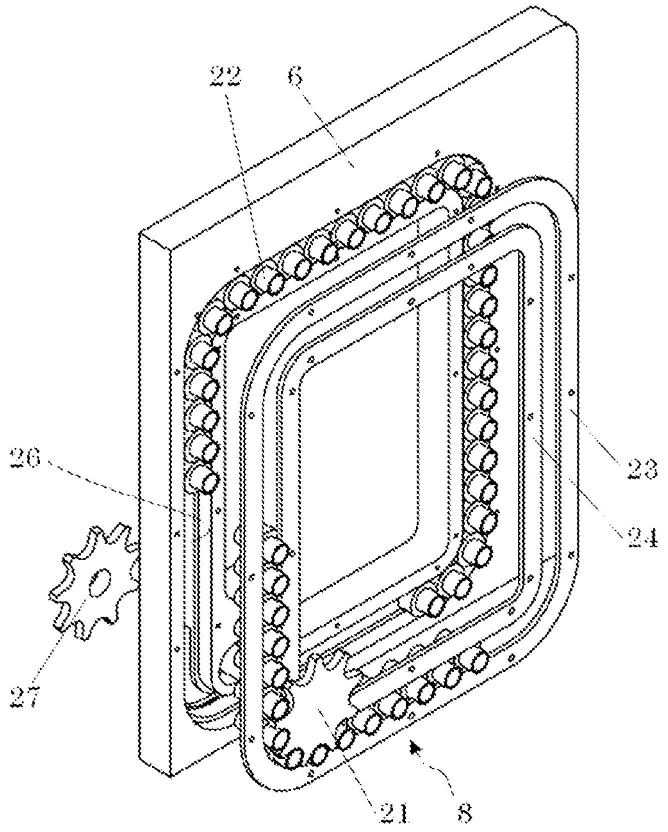
FIG. 3 is an exploded view of a circulation moving mechanism in an embodiment of the present application.

As shown in FIGS. 1-3, as an example of an embodiment of the present application, a stair lift 1 comprises: a carrier portion 2, configured for carrying a person or an object; a lift portion 3, configured for moving relative to the carrier portion 2; and a driver mechanism 4, configured for inducing the relative movement.

The carrier portion is a frame (box-shaped) structure which is open in both a front face and a bottom face. In the meanwhile, in FIGS. 1-2, for facilitating the understanding of the configuration of the carrier portion 2, only the frame parts of the frame structure are shown (that is, a middle part of the planes of the frame body is basically cut off). Also, the carrier portion 2 can be installed with seats, etc., allowing a user to sit on it or to place an object on it.

Casters 14 which are movable in all directions are disposed at a lower portion of the carrier portion 2 close to four corners. As a result, when the stair lift 1 is walking on a step surface of a non-linear stair, a moving direction thereof can be simply changed as needed. In addition, a rachet 15 is in fixed connection at an inner side of at least one of the casters 14. Further, a brake crank 12 in a general L-shape is provided thereon with pawls 28 configured to mesh with the rachet, the brake crank 12 is pivotally supported by a rotational shaft 16 at one end, while the other end of the brake crank 12 is provided with a brake wheel 13. The braking mechanism is as follows: in case that a traveling surface or the step surface of the stair 91 fails to provide a sufficient support (for example, when the casters 14 are raised), the brake wheel 13 will move downwards, the brake arm 12 will in turn move downwards, causing the pawls 28 meshing with the ratchet 15 whereby locking the corresponding caster 14. However, even in the braking state, the rotation of the caster 14 that causes the forward movement (the forward direction when going upstairs, or the backward direction when going downstairs) of the stair lift apparatus is not locked. Such braking mechanism prevents the stair lift from rolling unintentionally, in the meanwhile, the opportunity to go downstairs can be determined.

In addition, in the carrier portion 2, a main plate 6 along an X-Z plane is fixedly arranged at a position near the middle of a right-left direction of the carrier portion. Moreover, the main plate 6 is fixed on both lateral sides of the carrier portion 2, instead of being fixed on the bottom plate 3*a* as described hereinafter.

The lift portion 3 is configured in such a way that most of the lift portion 3 may be accommodated within the carrier portion 2. The lift portion 3 includes: a rectangular bottom plate 3*a*, being slightly smaller than a bottom opening of the carrier portion 2; a support 3*b*, erected on the rectangular bottom plate 3*a*; an lifting auxiliary arm 3*c*, installed on the support 3*b* and configured to slide in an up-down direction along the support 3*b*; and a fixation handle 19, configured for locking the lifting auxiliary arm 3*c* at a designated position whereby preventing the lifting auxiliary arm 3*c* from moving in the vertical direction.

The carrier portion 2 and the lift portion 3 are configurations that can be freely translated along the X-Z plane relative to each other through the support connection of the guide mechanism 5. More specifically, a longitudinal rail 5*a* is arranged on one side of the main plate 6 along the up-down direction; and the longitudinal rail 5*a* is provided with a longitudinal slider 5*b*, configured to slide along the longitudinal rail 5*a*. On the other hand, the bottom plate 3*a* is provided with a horizontal rail 5*c* along a front-rear direction; and the horizontal rail 5*c* is provided with a horizontal slider 5*d*, configured to slide along the horizontal rail 5*c*. The longitudinal slider 5*b* and the horizontal slider 5*d* are connected by a slider connector 5*f*. As a result, through the guide mechanism 5, it is possible for both the main plate 6, which is fixed on two sides of the carrier portion 2, and the bottom plate 3*a*, which is a component of the lift portion 3, to realize the freely translational movement in the up-down direction and the front-rear direction (that is, along the XZ plane). In other words, through the guide mechanism 5, the carrier portion 2 and the lift portion 3 can be installed together in a manner that the relative postures thereof do not change, that is, without relative rotation, and only transitional movement occurs relative to each other.

The driver mechanism 4 is a mechanism to induce the above-mentioned translational movement, and comprises a gear motor (driver source) 7 and the circulation moving mechanism 8. In this embodiment, the gear motor is installed next to one side of the main plate 6.

The circulation moving mechanism 8 is embedded in the main plate 6. For facilitating the understanding of the configuration of the circulation moving mechanism 8, some of the components including the main plate 6 are taken out and shown in FIG. 3. A quadrilateral (rounded quadrilateral) guide slot (groove) 26 with rounded corners is defined on the other side of the main plate 6. In addition, the configuration further comprises: a plurality of rollers (cylinders or stepped cylinders) 22 vertically arranged in a row without gaps therebetween, with one end of each roller in an axis direction being inserted into the guide slot 26 and configured for circulating along the guide slot 26; and two sprockets 21 and 27, configured for acquiring a driving force from the gear motor 7, whereby rotating and meshing with outer peripheries of the rollers 22. In addition, in this embodiment, the sprockets 21, 27 configured for synchronous rotation are installed at both the two sides of the main plate 6, respectively; but in some cases, it is also possible to use a single sprocket. In addition, the rollers 22 are embedded in the guide slot 26, and two baffles 23, 24 are installed to prevent the rollers 22 from falling off.

As a result of such a configuration, when the sprockets 21 and 27 rotate synchronously, the rollers 22 meshing with the sprockets 21 and 27 move cyclically in a manner of being sequentially pushed out along the guide slot (fixed and closed track) 26. In such condition, a specific one of the plurality of the rollers 22 is coaxially connected to a driving pin (moving member) 20, and the driving pin 20 is connected at the pillar 3*b*, which is a component of the lift portion 3, near an upper end of the pillar 3*b*. As a result, as the driving pin 20 circulates, the lift portion as a whole moves along a track of the guide slot 26 relative to the carrier portion 2, that is, transitional movement.

Lifting Action of the Stair Lift

Actions of going upstairs of the stair lift 1 whose configuration has been described in the above will be described hereinbelow with reference to FIGS. 4-9. It should be noted that FIGS. 4-9 illustrate the state of the stair lift 1 viewed from the right side.

Figure 4:
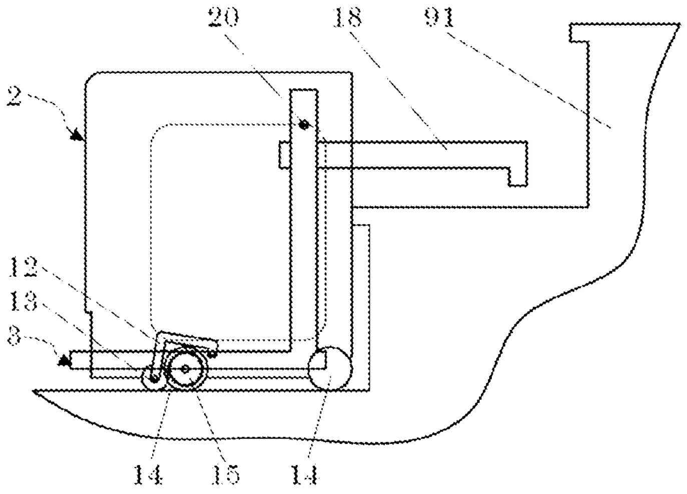
FIG. 4 is a schematic side view of a ready state of a stair lift when the stair lift moves upstairs in an embodiment of the present application.

FIG. 4 shows a ready state of the stair lift 1. In this ready state, a center of gravity of the person or the object is adjusted to a position near the middle of the front and rear casters 14. The center of gravity of the stair lift 1 is in the similar condition but is determined by a structural layout of the apparatus. It can also be equipped with a detection means configured to detect whether the position of the center of gravity of the person or the object is appropriate. Moreover, in the ready state, the lift portion 3 is located at a highest and front position. And the position of the lifting auxiliary arm 3*c* in the up-down direction is adjusted according to a height of a stair step to be traversed, and is then fixed by the handle 19.

Also, FIG. 4 illustrates a position state where a front of the stair lift 1 rests against an edge of a next step surface. This position is a starting position for going upstairs. If it is required to automatically determine such position in order to automatically carry out the action of going upstairs, it is a good choice to equip a front of the stair lift 1 with a contact sensor configured to detect the edge of the step surface.

Figure 5:
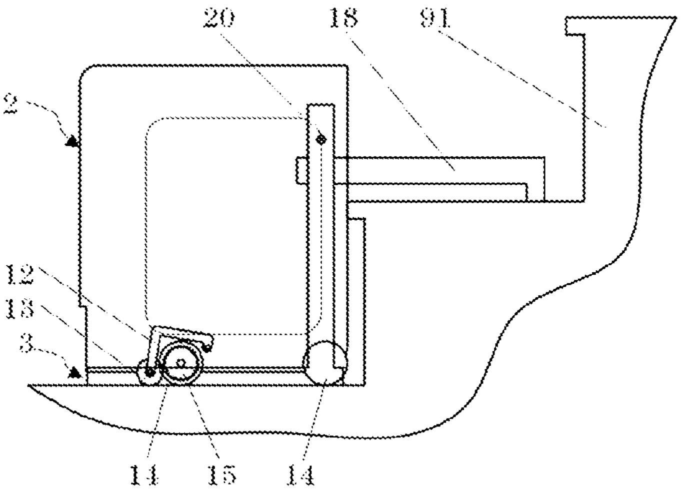
FIG. 5 is a schematic side view of a state where a lift portion of a stair lift is located on a current step surface and is assisted to contact a next step surface in an embodiment of the present application.

Next, as shown in FIG. 5, the gear motor 7 drives the driving pin 20 to move in a clockwise direction, and the lift portion 3 including the lifting auxiliary arm 3*c* as a whole moves downward. As a result, the bottom plate 3*a* of the lift portion 3 is in contact with a current step surface of the stair, while the lifting auxiliary arm 3*c* is in contact with a next step surface.

Figure 6:
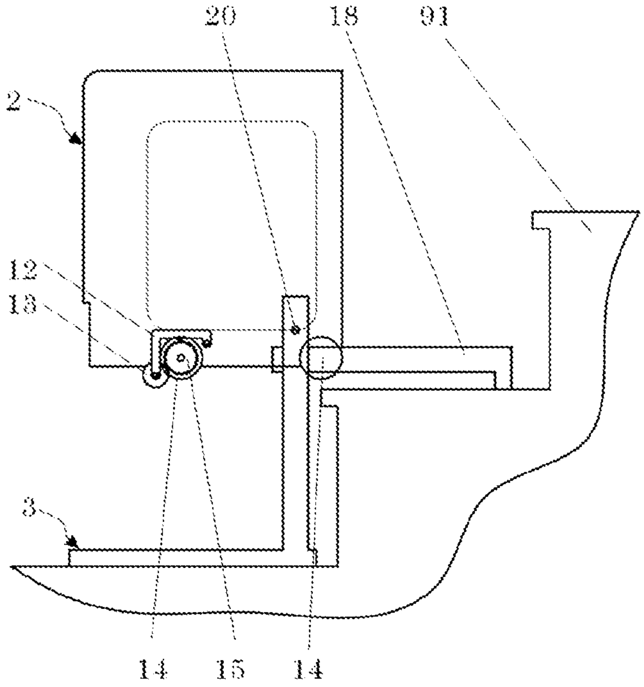
FIG. 6 is a schematic side view of a state where a carrier portion moves to a position of the same height of the next step surface of the stair in the embodiment of the present application.

As the driving pin 20 continues moving in the clockwise direction, as shown in FIG. 6, in a state where the bottom plate 3*a* and the lifting auxiliary arm 3*c* of the lift portion 3 are supported across the current step and the next step of the stairs, the carrier portion 2 is raised along the track of the guide slot 26 to a height of the next step. FIG. 6 illustrates the state where the carrier portion is raised to a highest position.

Figure 7:
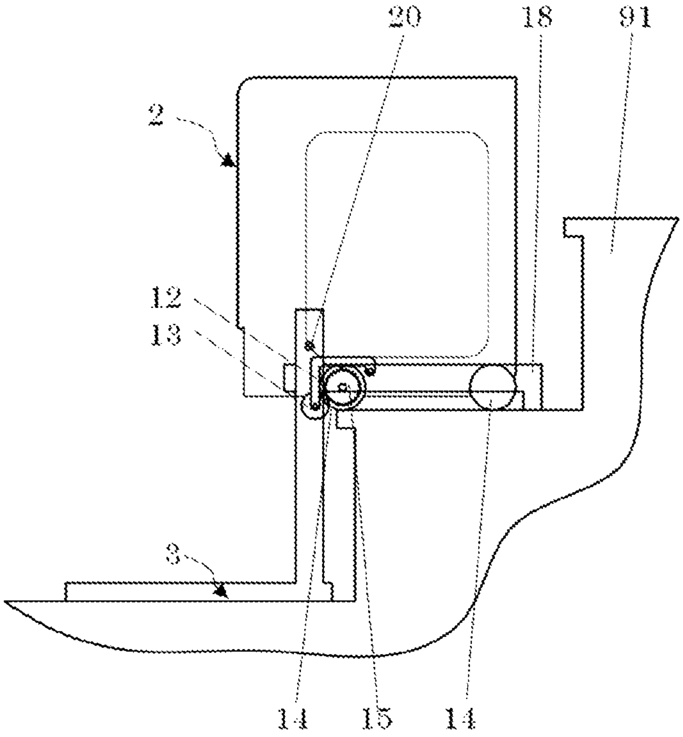
FIG. 7 is a schematic side view of a state where a caster touches the next step surface of the stair in an embodiment of the present application.

Then, as shown in FIG. 7, the carrier portion 2 moves to a foremost position along a lower part of the track. In other words, FIG. 7 shows a state where the carrier portion 2 is in contact with the next step surface. In such condition, the brake wheel 13 is in a suspended state, the pawls 28 arranged on the brake crank 12 mesh with the rachet 15, and the rotation of the casters 14 at the rear part of the carrier portion 2 are locked to prevent the rotation towards a backward direction, thereby preventing the stair lift 1 from rolling downward to a lower step surface unintentionally.

Figure 8:
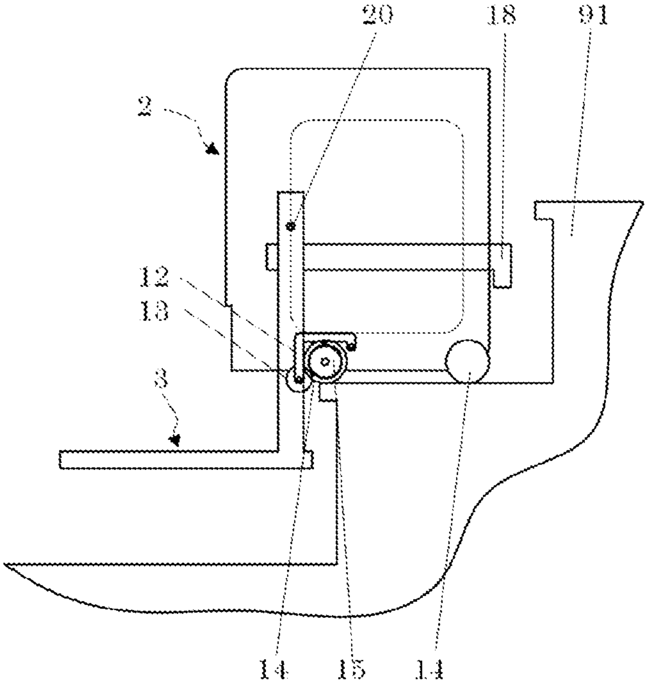
FIG. 8 is a schematic side view of a state where the lift portion is ascending and moving towards the next step surface of the stair in the embodiment of the present application.

Next, as shown in FIG. 8, the driving pin 20 continues moving in the clockwise direction along the track, so as to raise the lift portion 3.

Figure 9:
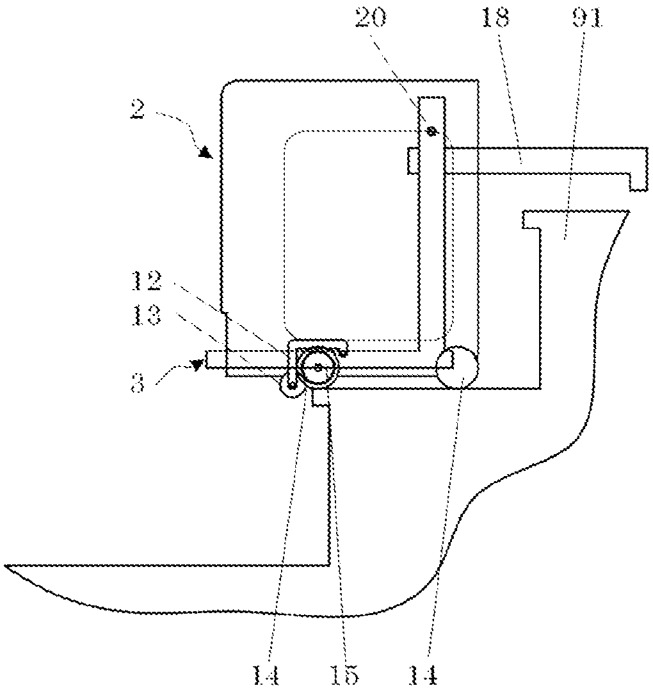
FIG. 9 is a schematic side view of a state where the stair lift returns to an original state and is ready for climbing up a next stair step in the embodiment of the present application.

Finally, as shown in FIG. 9, since the driving pin 20 continues moving in the clockwise direction along the track, the lift portion 3 returns to the state of being accommodated within the carrier portion 2, that is, the ready state. As a result of a series of the above actions, the climbing of one step surface of the stair is completed.

Then, the action of going upstairs onto another next step is carried out, however, when a width of the step surface of the stair is greater than a shift in the front-rear direction of the track (the guide slot 26) (the left-right direction as indicated in FIGS. 4-9), the stair lift 1 in the position state of FIG. 9 moves forwards until contacting with another next step surface, thereby entering the ready state for going up to the another next step. Thereafter, the same actions are repeated.

In addition, the action of going downstairs (descending) is a reverse sequence of the aforementioned actions of going upstairs. The stair lift moves forward through the front and rear casters 14, and the time when the brake wheel 13 traverses the steps and falls is the opportunity of descending. In case that the opportunity of descending is required to be automatically detected, it is a good choice to install a sensor configured to detect the falling of the brake wheel 13.

The embodiment as described in the above corresponds to claims 1-2. The embodiment comprises: a carrier portion 2, configured for carrying a person or an object; a lift portion 3, configured for moving relative to the carrier portion 2; and a driver mechanism 4, configured for inducing the relative movement. The carrier portion 2 and the lift portion 3 are connected and supported via a guide mechanism 5, and are configured for freely translating along an X-Z plane relative to each other. The driver mechanism 4 includes: a single gear motor (driver source) 7 and a circulation moving mechanism 8; and the circulation moving mechanism 8 includes a driving pin (moving member) 20, which is configured for moving along a predetermined closed track guide slot 26 under the driving of the single gear motor (driver source) 7. The driving pin 20 is connected to the lift portion 3, such that the carrier portion 2 and the lift portion 3 are configured for moving relative to each other along the track, whereby enabling the stair lift to go upstairs or downstairs.

Herein, the circulation moving mechanism 8 comprises: a guiding slot 26 arranged along the track; a plurality of rollers (cylinders or stepped cylinders) 22, vertically arranged in a row, with one end of each roller in an axis direction being inserted into the guide slot 26 and configured for circulating along the guide slot 26; and two sprockets 21 and 27, configured for acquiring a driving force from the gear motor 7, whereby rotating and meshing with outer peripheries of the rollers 22. Through the rotation of the sprockets 21 and 27, the rollers 22 circulate along the guide slot 26, in the meanwhile, a specific one of the rollers 22 is connected to the driving pin 20 which serves as the moving member.

Based on such configuration, the carrier portion 2 and the lift portion 3 can circulate along the track relative to each other with constant postures, and perform the translational movement, thereby going up or down the stair. In addition, because the driver mechanism 4 that includes the circulation moving mechanism 8 only needs one gear motor as the driver source, as well as only one drive shaft, the control of the driver mechanism 4 can be easily carried out, and therefore, the stair lift with a simple structure can be realized.

In addition, in the above embodiment, in the movement of the carrier portion 2 during the actions of going upstairs or downstairs of the stair lift, the stair lift 1 is supported by the bottom plate 3*a* and the lifting auxiliary arm 3*c* of the lift portion 3 to traverse two step surfaces. In this way, the going upstairs or downstairs of the stair lift can be realized by keeping a normal state (horizontal state) thereof without requiring special means, thereby achieving the purpose of improved safety.

In addition, the above embodiments are not only applicable to linear stairs, but also applicable to non-linear stairs. Since it is the step surface, rather than the edge of the step surface, that is used as a supporting base surface of the apparatus, this is advantageous in preventing the stairs from being damaged during the going upstairs or downstairs of the stair lift.

In addition, the circulation moving mechanism 8 is not restricted to the above-described configuration example, but can also adopt other structures as described hereinbelow. In other configurations of the circulation moving mechanism 8 as described hereinbelow, only the circulation moving mechanism 8 is taken out for illustration. It should also be noted that parts with configurations or functions similar to those described in embodiment 1 are labeled by the same reference numerals, and repeated descriptions have been deleted.

Figure 10:
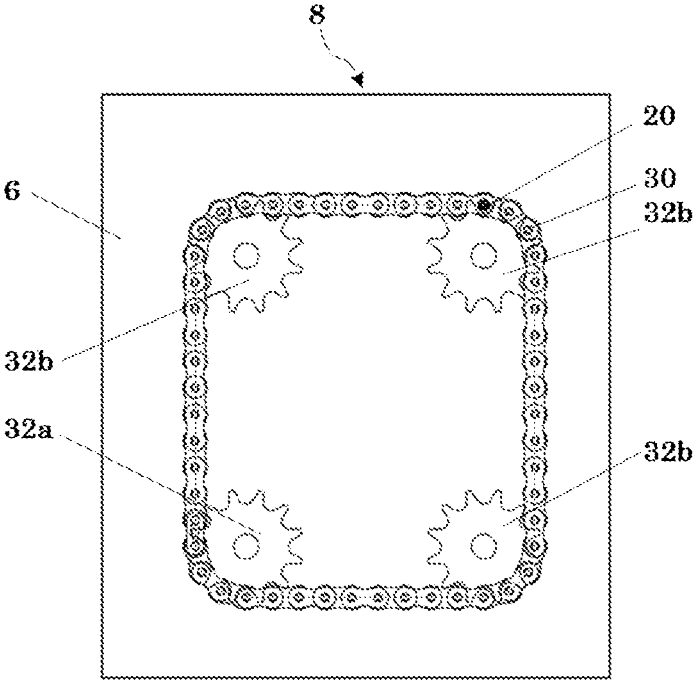
FIG. 10 is a schematic diagram of a second example (a transmission chain mode) of the circulation moving mechanism in an embodiment of the present application.

The circulation moving mechanism 8 as shown in FIG. 10 is called a transmission chain mode. Four sprockets are arranged on the main plate 6 at positions where a connection of shaft centers of the four sprockets presents a rectangular, one of the four sprockets is a driving sprocket 32*a*, and the other three are idler sprockets 32*b*. A transmission chain 30 is wound on the four the sprockets, and at a specific position on the transmission chain 30 is arranged the driving pin 20 as the moving member. By the rotary driving of the driving sprocket 32*a*, the transmission chain 30 circulates, and the driving pin 20 in turn circulates along the closed track of the rounded quadrilateral (the track of the transmission chain 30). Also, in the mechanism, a guide slot (not shown in the figure) configured for guiding the movement of the driving pin 20 can be further provide on the main plate 6.

Figure 11:
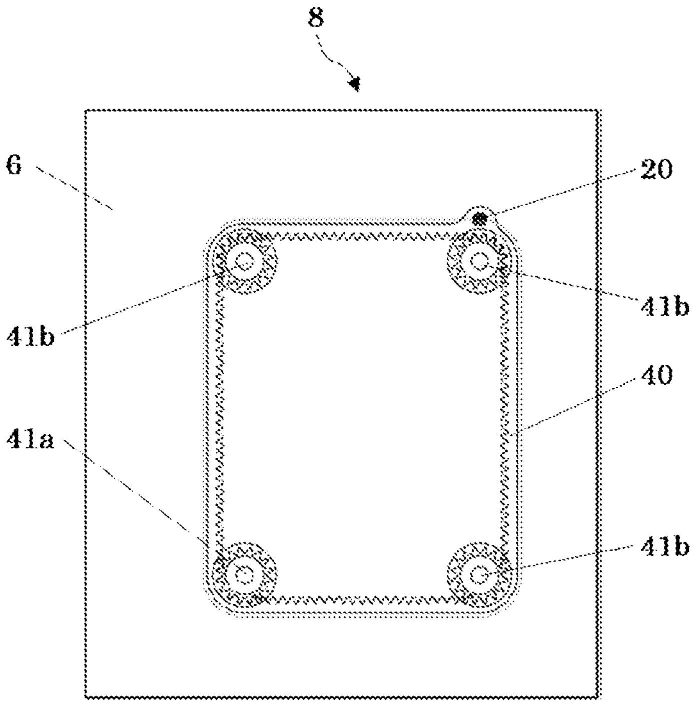
FIG. 11 is a schematic diagram of a third example (a toothed belt mode) of the circulation moving mechanism in an embodiment of the present application.

The circulation moving mechanism 8 as shown in FIG. 11 is called a toothed belt mode. On the main plate 6, four pulleys are arranged at the position where a connection the shaft centers of the four pulleys presents a rectangular. One of the pulleys is a driving pulley 41*a*, and the other three are idle pulleys 41*b*. A toothed belt (belt with teeth) 40 is wound on these four pulleys, and at a specific position on the toothed belt 40 is provided the driving pin 20 as the moving member. By the rotary driving of the driving pulley, the toothed belt 40 circulates, and the driving pin 20 in turn circulates along the closed track of the rounded quadrilateral (the track of the toothed belt 40). Also, in the mechanism, a guide slot (not shown in the figure) configured for guiding the movement of the driving pin 20 can be further provide on the main plate 6.

Figure 12:
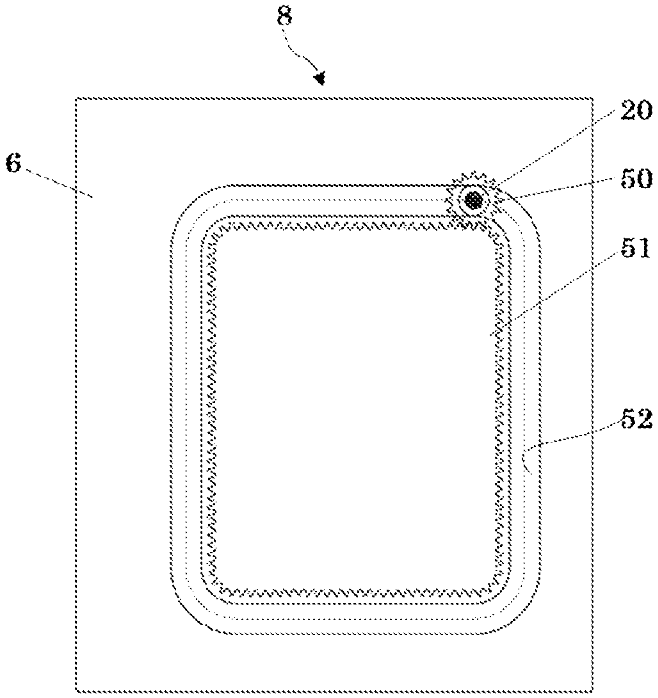
FIG. 12 is a schematic diagram of a fourth example (a rounded quadrilateral external gear mode) of the circulation moving mechanism in an embodiment of the present application.

The circulation moving mechanism 8 as shown in FIG. 12 is called a rounded quadrilateral external gear mode, which includes: a pinion 50; a non-circular, rounded quadrilateral gear (rounded quadrilateral external gear) 51 fixed on the main plate 6; a driving pin 20 provided on the pinion 50; a guide slot 52, defined on the main plate 6 and configured for guiding the movement of the driving pin. In a state of meshing with the rounded quadrilateral gear 51, the pinion 50 is driven to rotate, and at the same time, guided by the guide slot 52 to revolve along a periphery of the rounded quadrilateral gear 51, such that the driving pin 20 is made cyclically moving along the closed, rounded quadrilateral track.

Figure 13:
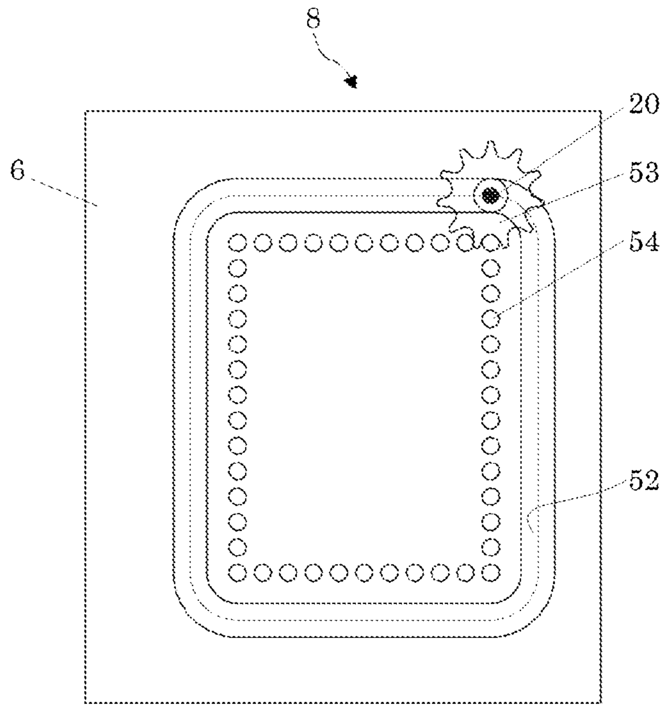
FIG. 13 is a schematic diagram of a fifth embodiment (a mode of an external gear formed of cylindrical pins) of the circulation moving mechanism in an embodiment of the present application.

The circulation moving mechanism 8 as shown in FIG. 13 is called a mode of an external gear formed of cylindrical pins, the configuration of which is similar to that of rounded quadrilateral external gear as described in the above. As an alternative to the rounded quadrilateral gear 51, a plurality of cylindrical pins 54 are arranged in a rectangular shape. The sprocket 53 rotates and meshes with the plurality of cylindrical pins 53, and the driving pin 20 provided on the sprocket 53 circulates along the closed, rounded quadrilateral track.

Figure 14:
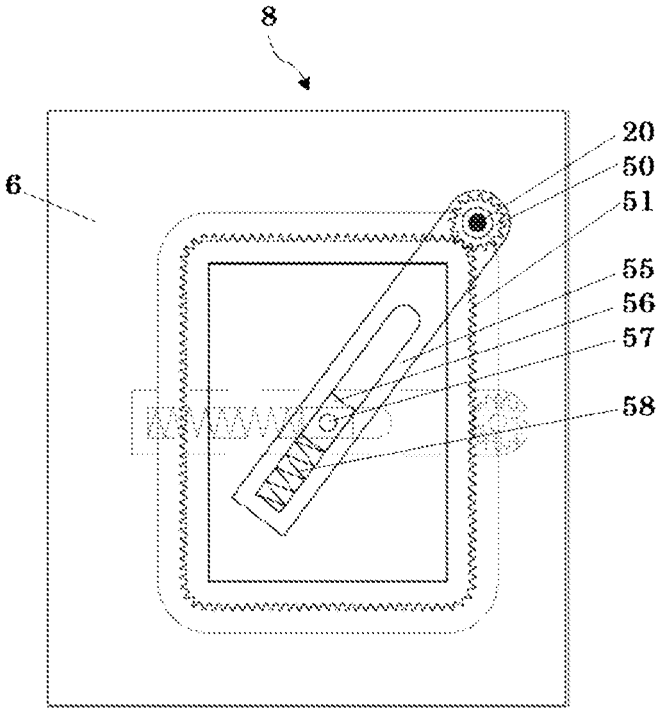
FIG. 14 is a schematic diagram of a sixth example (a mode of a rounded quadrilateral external gear+an arm) of the circulation moving mechanism in an embodiment of the present application.

The circulation moving mechanism 8 as shown in FIG. 14 is called a mode of a rounded quadrilateral external gear+an arm, the structure of which includes: an arm 55; a sliding block 56; and a rotating shaft 57 and an elastic member 58 that are arranged at the center of the rounded quadrilateral gear 51. The sliding block 56 constitutes a moving pair together with the arm 55, and is fixedly connected with the rotating shaft 57. In addition, one end of the arm 55 is provided with a pinion 50, and the elastic member 58 is disposed between the arm 55 and the sliding block 56. The elastic member 58 always generates a pushing force that pushes the pinion 50 against the tooth surface of the rounded quadrilateral gear 51, thereby keeping the two meshing with each other.

Figure 15:
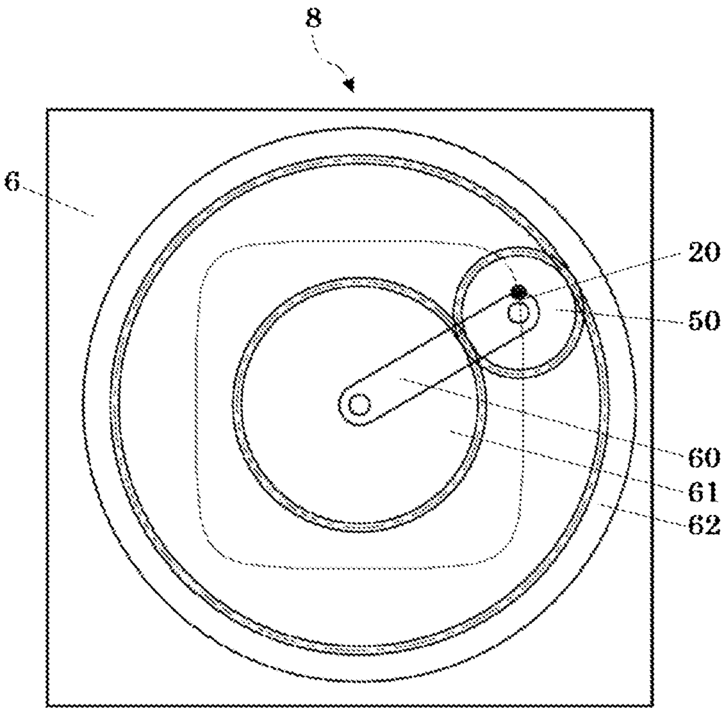
FIG. 15 is a schematic diagram of a seventh example (a planetary gear mode) of the circulation moving mechanism in an embodiment of the present application.

The circulation moving mechanism 8 as shown in FIG. 15 is called a planetary gear mode, the structure of which includes: a pinion 50, an arm 60, a sun gear 61, and an internal gear 62. In order to allow a motion track of the driving pin 20 provided on the pinion 50 to present an approximate quadrilateral track, which is desired in the present application, as an example, the number of teeth of the pinion 50 can be set to ¼ the number of teeth of the internal gear 62. In such condition, when the pinion 50 revolves around the sun gear 61 for one revolution, the pinion 50 rotates for four revolutions at the same time. The driving pin 20 is arranged to protrude from an eccentric position of the rotation center axis of the pinion 50. In addition, as the driving input of the circulation moving mechanism, the selection of the sun gear 61 has the advantage of simpler configuration of the driver source in comparison to the selection of the pinion 50. In case of such advantage is discarded, the sun gear can be deleted. For those stair lift where the heteromorphic motion track of the driving pin 20 is possible, the deletion of the internal gear 62 is also possible.

Figure 16:
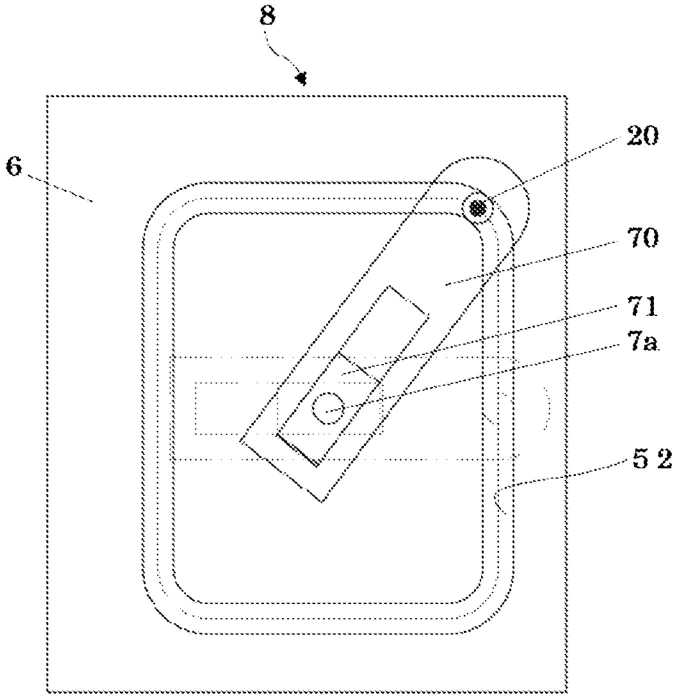
FIG. 16 is a schematic diagram of an eighth example (a driving arm mode) of the circulation moving mechanism in an embodiment of the present application.

The circulation moving mechanism 8 as shown in FIG. 16 is called a rotational driving arm mode, the structure of which includes a driving arm 70 and a driving slider 71. A driving pin 20 provided on the driving arm 70 is guided by the guide slot 52; and the driving slider 71 and the driving arm 70 constitute a moving pair. Under the rotary driving of an output shaft 7*a* of a gear motor that is in fixed connection with the driving slider 71, the driving slider 71 rotates accordingly, and the driving arm 70 slides relative to the driving slider 71 while rotating, in this way, the driving pin 20 circulates along a closed, rounded quadrilateral track.

Figure 25:
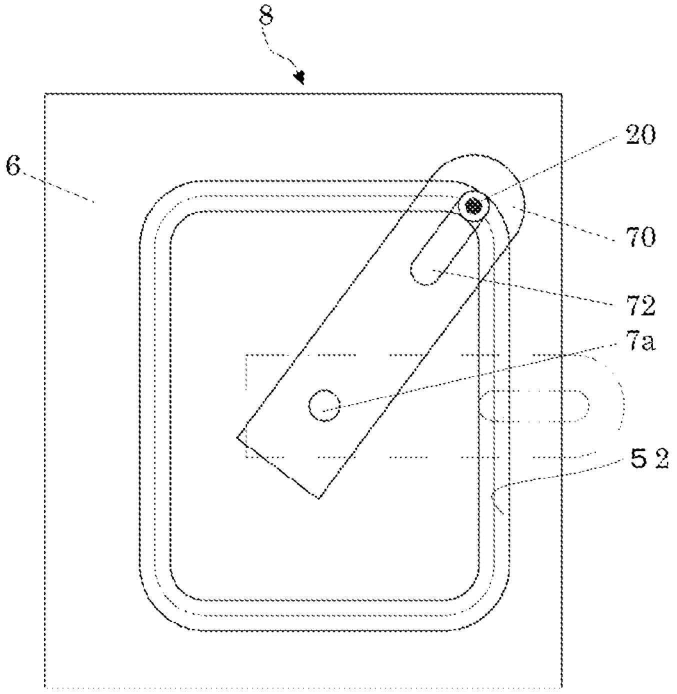
FIG. 25 is a schematic diagram of the tenth example (a mode of a driving arm having an elongated hole) of the circulation moving mechanism in an embodiment of the present application.

The circulation moving mechanism 10 as shown in FIG. 25 is called a mode of a driving arm having an elongated hole, the structure of which includes: a driving arm 70, and the long hole 72 defined in the driving arm 70. The driving pin 20 inserted into the long hole 72 is guided by the guide slot 52, the driving arm 70 is fixedly connected with the output shaft 7*a* of the gear motor, and by the rotation of the output shaft 7*a* of the gear motor, the driving arm 70 rotates, so that the driving pin 20 circulates along a closed, rounded quadrilateral track.

Figure 17:
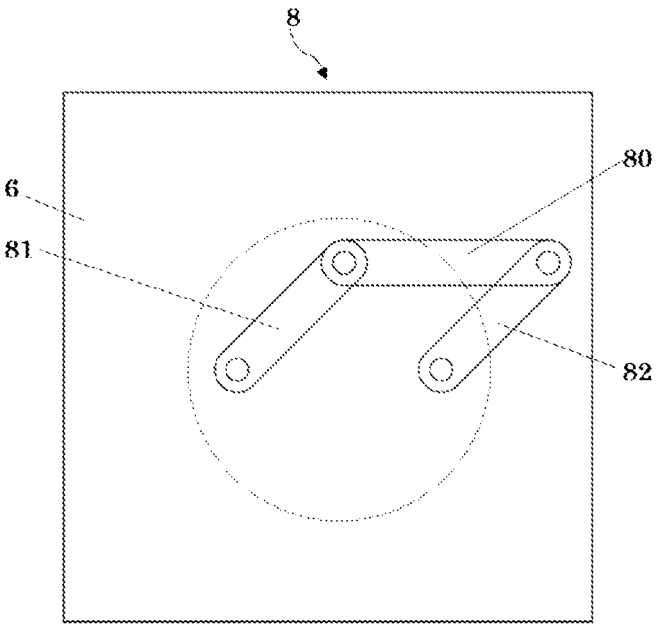
FIG. 17 is a schematic diagram of a ninth example (a parallel crank mechanism mode) of the circulation moving mechanism in an embodiment of the present application.

The circulation moving mechanism 9 as shown in FIG. 17 is called the parallel crank mechanism mode. The main plate 6 functions as a stand, and forms a parallel crank mechanism together with a connection rod 80, a driving crank 81, and a driven crank 82. The connecting rod 80 serves as the moving member and is fixedly connected to the lift portion 3, and by the rotary driving of the active crank 81, the carrier portion 2 and the lift portion 3 which are fixedly connected to the main plate 6 are translated along a circular motion track.

Figure 18A:
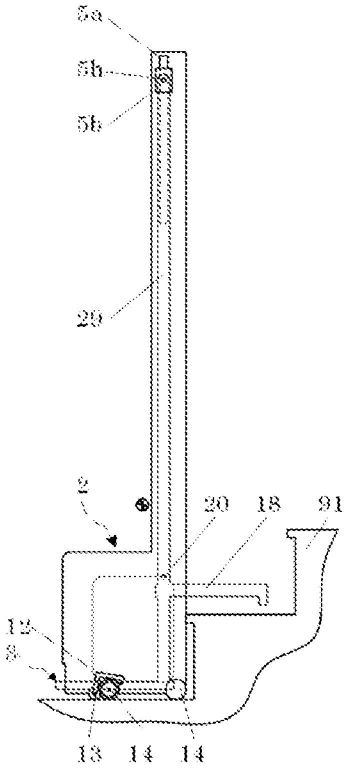
Figure 18B:
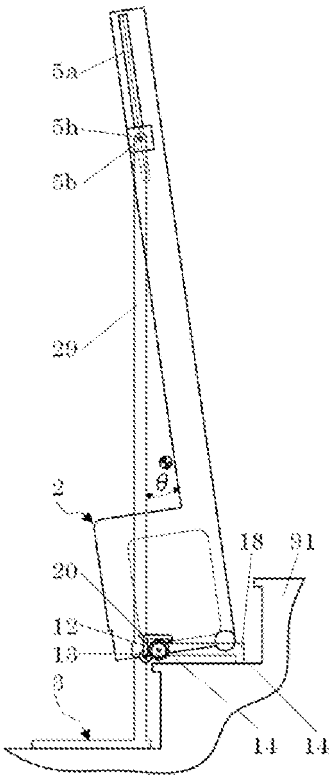

Regarding the guide mechanism 5, two mechanisms (including those of similar type of mechanism) are chosen from: the linear guide mechanism which is classified as a moving pair, the translational moving mechanism which utilizes a motion track of the connection rod in the parallel crank mechanism, and an approximate linear guide mechanism which utilizes an approximate linear motion track of one point on a swing arm with a very small swing angle range, so as to constitute the guide mechanism of the present application. In addition, if the parallel crank mechanism is used as the circulation moving mechanism, since such mechanism also functions as the guide mechanism, the guide mechanism can be the same parallel crank mechanism. When the guide mechanism as shown in FIGS. 18A-B is used, the maximum allowable range of a swing angle θ of the swing arm 29 of the guide mechanism satisfies that during the forward or backward movement of the carrier portion 2 of the stair lift, the center of gravity of the entire apparatus including person or object placed on the carrier portion 2 (even in the case that the apparatus shakes) is always within the range between a front support point and a back support point of the carrier portion 2.

Figure 19:
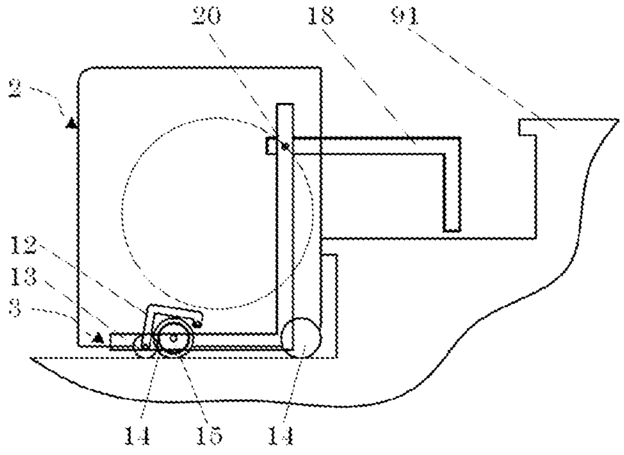
FIG. 19 is a schematic side view of a ready state of the stair lift when the translational motion track of the circulation moving mechanism is circular in an embodiment of the present application.
Figure 20:
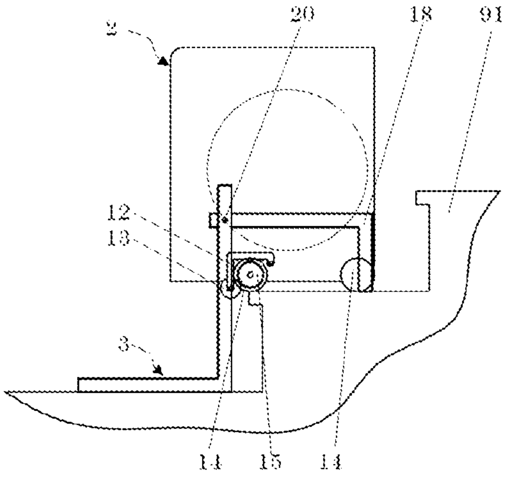
FIG. 20 is a schematic side view of a state where the caster touches a next step surface of the stair when the translational motion track of the circulation moving mechanism is circular in an embodiment of the present application.
Figure 21:
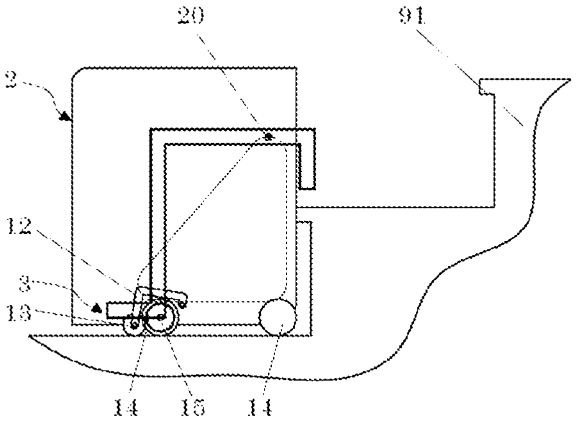
FIG. 21 is a schematic side view of a ready state of the stair lift when the translational motion track of the circulation moving mechanism is triangular in an embodiment of the present application.
Figure 22:
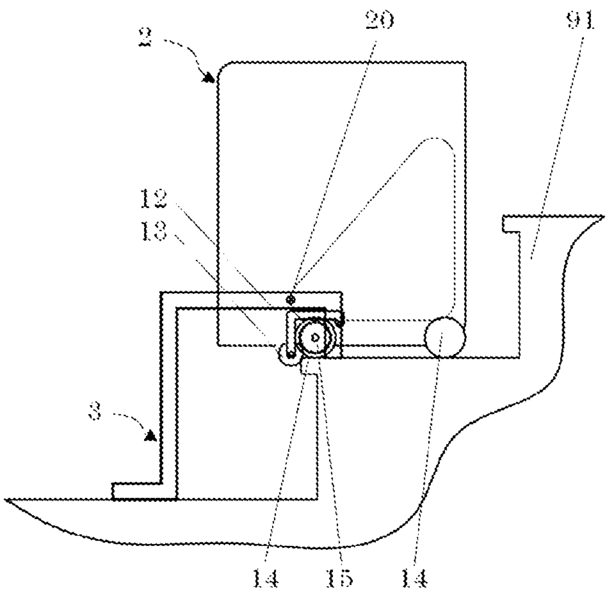
FIG. 22 is a schematic side view of a state where the caster touches a next step surface of the stair when the translational motion track of the circulation moving mechanism is triangular in an embodiment of the present application.

In order to improve the safety of the stair lift implemented by the above embodiments and various deformations, no matter the carrier portion or the lift portion is in a supported state, from the view of increasing the front-rear distance of the support surface, a desired motion track of the circulation moving mechanism is a quadrilateral motion track, however, closed tracks of other types, such as in a circle or an approximate triangle, may also be possible. For example, if a circular motion track is used, the stair lift can be constructed with a simpler structure. If an approximate triangle motion track is used, compared with a quadrilateral motion track, for the stair of the same size, it is possible to perform the going upstairs or downstairs efficiently due to the shortened length of the motion track. FIG. 19 and FIG. 20 respectively show a ready state of the stair lift 1 and a state of the stair lift 1 where the carrier portion 2 is raised to a next step surface when a circular motion track is used. FIG. 21 and FIG. 22 respectively show a ready state of the stair lift 1 and a state of the stair lift 1 where the carrier portion 2 is raised to a next step surface when an approximate triangle motion track is used.

Other Configurations of the Stair Lift

Figure 23:
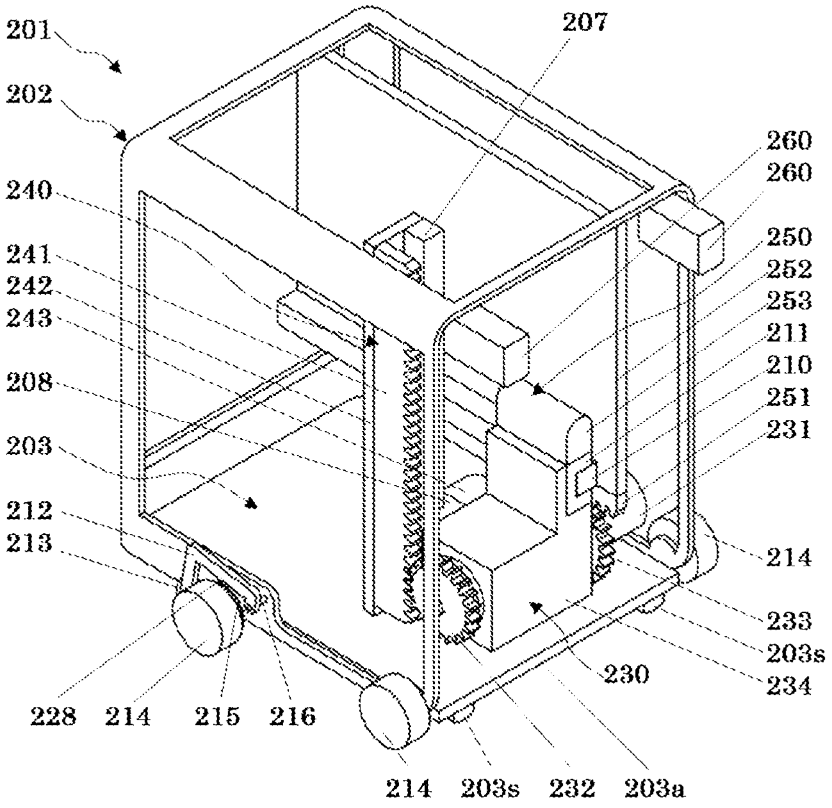
FIG. 23 is a right front isometric view of a second embodiment of stair lift in an embodiment of the present application.

FIG. 23 shows a stair lift 201 as a second embodiment of the present application. Here, for the parts that are the same as or similar to those in the stair lift 1 of the above-described embodiment 1, the same symbols are attached to lower two digits of the reference numerals, and repeated descriptions have been deleted.

The driver mechanism 230 of this embodiment includes: a gear motor 231, a first gear 232, and a second gear 233, which belong to a driver source, and a bracket 234 that supports the gear motor 231. The gear motor has a body part and an output shaft, and the body part is pivotally supported by the bracket 234 (the body part itself is supported by a pivot that can rotate on the same axis as the output shaft). The first gear 232 is installed on the output shaft, and the second gear 233 is installed on the body part.

An up-down directional moving mechanism 240 includes: an up-down rack 241; an up-down rail 207; an up-down slider 208; a first support plate 242; and a first locking mechanism 243. The first support plate 242 is fixedly connected to a lift portion 203, the up-down rail 207, and the up-down rack 241. The up-down rack meshes with the first gear 232. In addition, the up-down rail 207 and the up-down slider 208 constitute a moving pair.

A front-rear directional moving mechanism 250 includes: a front-rear rack 251; a front-rear rail 210; a front-rear slider 211; a second support plate 252; and a second locking mechanism 253. The second support plate 252 is fixedly connected with the carrier portion 202, the front-rear rail 210, and the front-rear rack 251. The front-rear rack 251 meshes with the second gear 233. In addition, the front-rear rail 210 and the front-rear slider 211 form a moving pair.

When the up-down directional moving mechanism 240 is driven, the second locking mechanism 253 provided at one side of the front-rear directional moving mechanism 250 operates to restrict the rotation of the second gear 233, in the meanwhile, the first locking mechanism 243 provided at one side of the up-down directional moving mechanism 243 is unlocked. As a result, under the driving of the gear motor 231, the first gear 232 rotates and drives the up-down directional moving mechanism 240. And the carrier portion 202 and the lift portion 203 move in the up-down direction relative to each other under the driving of the up-down directional moving mechanism 240.

When the front-rear directional moving mechanism 250 is driven, the second locking mechanism 253 is unlocked, and at the same time the first locking mechanism 243 provided at one side of the up-down directional moving mechanism 240 operates to restrict the rotation of the first gear 232. As a result, under the driving of the gear motor 231, the body part of the gear motor 231 rotates, and the second gear 233 rotates accordingly. As a result, the front-rear directional moving mechanism 250 is driven. And the carrier portion 202 and the lift portion 203 move in the front-rear direction relative to each other under the driving of the front-rear directional moving mechanism 250.

At the same time, in this embodiment, a pair of stair step height detection means 260 are arranged at both the left and the right on an upper front part of the carrier portion 202. The stair step height detection means 260 can use an optical sensor or the like. In addition, contact sensors **203*s* are arranged at the left and right of a bottom surface of the bottom plate 203*a* of the lift portion 203**.

Figure 24:
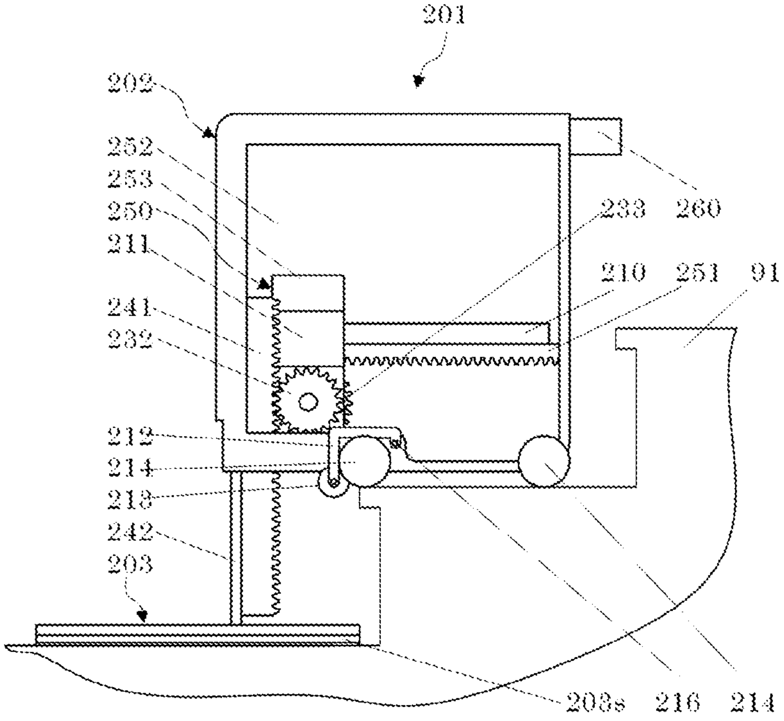
FIG. 24 is a schematic side view of the second embodiment of the stair lift in a state of moving upstairs in an embodiment of the present application.

Here, by referring to FIG. 24, the effect of the above-mentioned configuration will be explained. When going upstairs, the stair lift 201 moves forward, and when the carrier portion 202 comes into contact with a step edge, it is used as an opportunity to start going upstairs and drives the up-down directional moving mechanism 240. According to the height of a next step to be climbed detected by the stair step height detection means 260, the caster 214 is raised to a height slightly exceed (for example: about 5 mm) the height of next step to be climbed through the control of a control device (not shown). After that, the front-rear directional moving mechanism 250 is switched to, making the carrier portion 202 move forward. After that, the up-down directional moving mechanism 240 is switched to, such that the carrier portion 202 is descended onto the next step surface, and then the up-down directional moving mechanism is continued driven, to raise the lift portion 203 to the highest position. Thereafter, the front-rear directional moving mechanism 250 is switched to again, such that the lift portion 203 moves forward, and the stair lift 201 returns to the ready state of the stair lift. These actions are repeated in turn.

Also, when the stair lift 201 of the second embodiment goes downstairs, the contact sensors **203*s* installed on the bottom surface of the bottom plate 203*a* of the lift portion 203 detect the contact with the next step surface to determine the opportunity to switch from the up-down directional movement to the front-rear directional movement of the stair lift 201**. In this way, both the up-down directional movement and the front-rear directional movement are realized, depending on different output forms of the driver mechanism configured with a single driver source, so that it is possible to provide a compact stair lift.

In addition, the first locking mechanism 243 and the second locking mechanism 253 in the second embodiment may not be two independent locking mechanisms. For example, a locking mechanism with at least two or more locking actions is also possible, for example, a locking mechanism with different locking actions occurring at different moving positions of the same actuator; and a locking mechanism where the elastic force of an electromagnet and an elastic member are used, and two locking actions are triggered by an ON state and an OFF state of the electromagnetic, etc.

As described above, the stair lift 201 of the second embodiment includes: a carrier portion 202, configured to carry people or things; a lift portion 203; a driver mechanism 230, provided with a gear motor 231 as a single driver source; an up-down directional moving mechanism 240, configured for inducing a relative movement between the carrier portion 202 and the lift portion 203 in an up-down direction; a front-rear directional moving mechanism 250, configured for inducing a relative movement between the carrier portion 202 and the lift portion 203 in a front-rear direction; a first locking mechanism 243, configured for locking the up-down directional moving mechanism 240 and belonging to a first locking means; and a second locking mechanism 253, configured for locking the front-rear directional moving mechanism 250 and belonging to a second locking means. The up-down directional moving mechanism 240 and the front-rear directional moving mechanism 250 are respectively driven by different output forms of the driver mechanism 230, in order to alternately lock the first locking mechanism 243 belonging to the first locking means and the second locking mechanism belonging to the second locking means, and at the same time, the driver mechanism 230 sequentially moves the carrier portion 202 and the lift portion 203 relative to each other in the front-rear direction or the up-down direction. The lift portion 203 and the carrier portion 202 perform translational movements relative to each other along a closed circulation motion track with constant postures, whereby going upstairs or downstairs.

Here, the different output forms of the driver mechanism mentioned in the second embodiment above are as follows. Since the necessary movements in the above-mentioned second embodiment are two independent movements in the up-down direction and the front-rear direction, the driver mechanism is required to have two different output forms. Based on this, the "different output forms of the driver mechanism" mentioned here means that for a driver mechanism where the relative movement between the components becomes uncertain once the degree of freedom of a moving pair contained therein increases by one, a determined output motion will be different when different one degree of freedom is restricted. The present application is not limited to the above-mentioned second embodiment. Various modified embodiments can be implemented within the scope of the present application including the different output forms of the driver mechanism. For example, in addition to the driver mechanism that uses the main body and the drive shaft of the gear motor in a relative driving relationship with one being fixed and the other outputting so as to output two different output forms; other driver mechanisms may be exemplified one by one, for example, a driver mechanism that adopts a planetary gear mechanism (wave gear mechanism), in which, one of the sun gear, the internal gear, and the planetary gear is used as the input end, and the rotation of one of the remaining two gears is used as the output end, thereby having two different output forms; a driver mechanism which adopts a screw mechanisms with different output forms caused by nut rotation or movement; a driver mechanism that adopts a linear moving mechanism, including a rack and a pinion, and possessing two different output forms due to the linear movement of the rack or the linear movement of the pinion; and a driver mechanism that also adopts a linear movement mechanism formed by a rack and a pinion, with the rack provided with double linear guides, thereby possessing two different output forms by fixing any one of the double linear guides.

The above are only preferred embodiments of the present application and are not intended to limit the present application. For those skilled in the art, the present application may have various modifications and changes. Any modification, equivalent replacement, improvement, etc., made within the spirit and principle of the present application should be included within the scope of the claims of the present application.

What is claimed is:

1. A stair lift, comprising:

a carrier portion;

a lift portion;

a driver mechanism, provided with a single driver source;

an up-down directional moving mechanism, configured for inducing a relative movement between the carrier portion and the lift portion in an up-down direction;

a front-rear directional moving mechanism, configured for inducing a relative movement between the carrier portion and the lift portion in a front-rear direction;

a first locking means, configured for locking the up-down directional moving mechanism; and a second locking means, configured for locking the front-rear directional moving mechanism;

wherein the up-down directional moving mechanism and the front-rear directional moving mechanism are respectively driven by different output forms of the driver mechanism;

the first locking means and the second locking means are alternately locked, and at the same time, the driver mechanism sequentially moves the carrier portion and the lift portion relative to each other in the front-rear direction or the up-down direction, such that the lift portion and the carrier portion perform translational movements relative to each other along a closed circulation motion track with constant postures, whereby going upstairs or downstairs.

* * * * *